July 4, 1967   W. J. FRIERDICH   3,329,883
POWER CONTROL SYSTEM WITH WIDE RANGE PHASE CONTROL
Filed Oct. 16, 1963   7 Sheets-Sheet 1

INVENTOR.
WALDO J. FRIERDICH
BY
*Alfred W Petchaft*
ATTORNEY

July 4, 1967  W. J. FRIERDICH  3,329,883
POWER CONTROL SYSTEM WITH WIDE RANGE PHASE CONTROL
Filed Oct. 16, 1963  7 Sheets-Sheet 2

INVENTOR.
WALDO J. FRIERDICH
BY
ATTORNEY

July 4, 1967  W. J. FRIERDICH  3,329,883
POWER CONTROL SYSTEM WITH WIDE RANGE PHASE CONTROL
Filed Oct. 16, 1963  7 Sheets-Sheet 4

INVENTOR.
WALDO J. FRIERDICH
BY
ATTORNEY

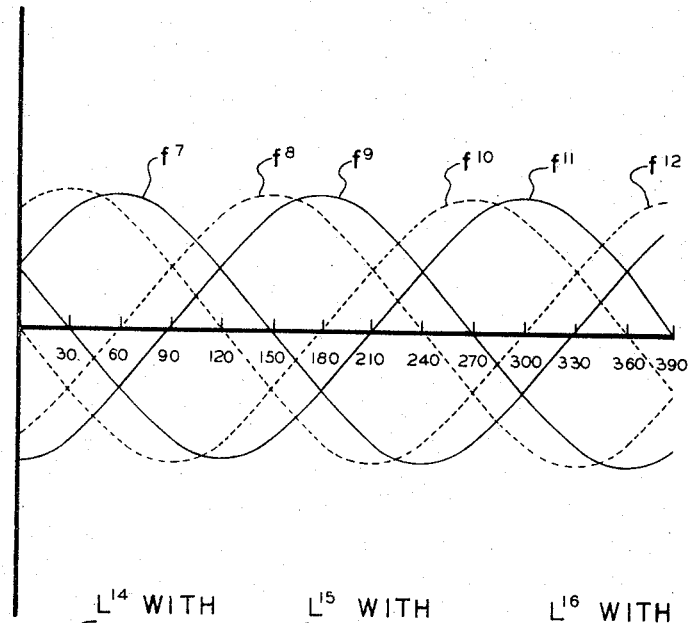
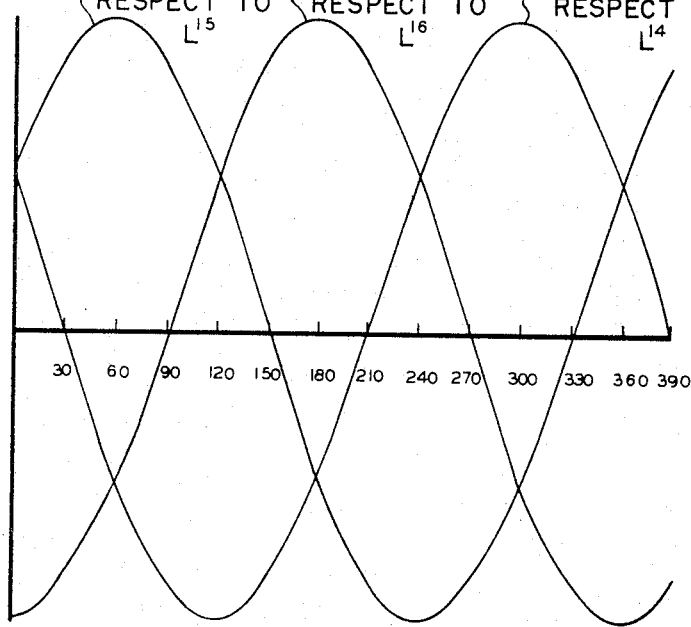
FIG. 9
FIG. 10
INVENTOR.
WALDO J. FRIERDICH
BY
*Alfred W. Petchaft*
ATTORNEY

WAVE FORM OF VOLTAGE $L^{14}$ WITH RESPECT TO $L^{15}$

VOLTAGE OF $L^{14}$ WITH RESPECT TO $L^{15}$

INVENTOR.
WALDO J. FRIERDICH
BY
Alfred W. Petchaft
ATTORNEY

United States Patent Office 3,329,883
Patented July 4, 1967

3,329,883
POWER CONTROL SYSTEM WITH WIDE RANGE PHASE CONTROL
Waldo J. Frierdich, Highland, Ill., assignor to Basler Electric Company, Highland, Ill., a corporation of Illinois
Filed Oct. 16, 1963, Ser. No. 316,583
24 Claims. (Cl. 321—5)

ABSTRACT OF THE DISCLOSURE

A polyphase power control system is disclosed which employs silicon controlled rectifiers which are triggered at various phase angles to produce different power outputs. To permit variation of the silicon controlled rectifier triggering signals over a wide range of phase angles, the triggering current is derived from at least two of the phases through diodes thereby to provide a voltage of sufficient magnitude to produce rectifier triggering for substantially more than 180° of each cycle.

This invention relates in general to certain new and useful improvements in electrical power controllers or power handling devices such as three-phase bridge rectifiers, for example.

It is the primary object of the present invention to provide a novel signal generator which is adapted for use in combination with various types of electrical power circuit-components to form a three-phase controlled rectifier bridge converter or an A.C. power controlling device.

It is another object of the present invention to provide a signal generator of the type stated for deriving signals from a three-phase voltage source, which signals have adequate power over a broad phase-range so that the output of the device upon which the signals are imposed can be efficiently controlled.

It is an additional object of the present invention to provide a converter of the type stated in which only a small amount of control current is required to maintain full continuity of the control function.

It is a further and more specific object of the present invention to provide a three-phase rectifier bridge converter including silicon controlled rectifiers in combination with a signal generator of the type stated in which the D.C. output can be readily controlled from zero output to maximum output in a relatively simple and economical manner.

It is also another and more specific object of the present invention to provide an A.C. power control device including silicon controlled rectifiers or the like in combination with a signal generator of the type stated in which the A.C. output can be efficiently controlled from zero output to maximum output in a relatively simple and economical manner.

It is also an object of the present invention to provide electrical power devices of the type stated which operate with maximum efficiency regardless of load or external conditions.

With the above and other objects in view, my invention resides in the novel features of form, construction, arrangement, and combination of parts presently described and pointed out in the claims.

In the accompanying drawings—

Figure 4:
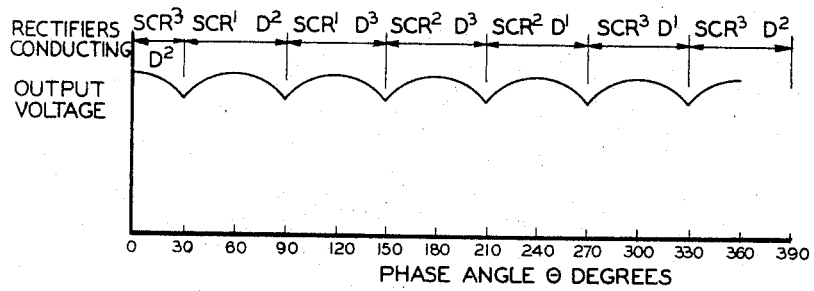
Figure 5:
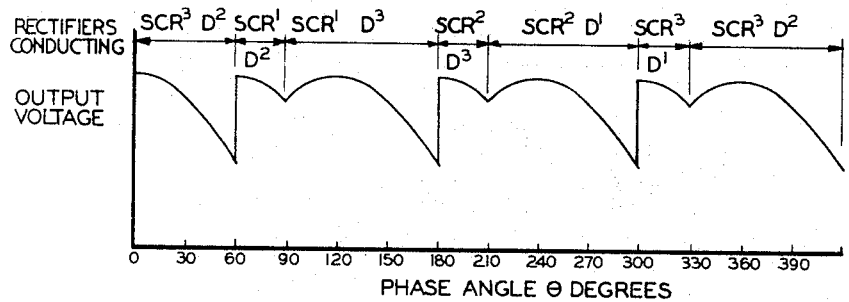
Figure 6:
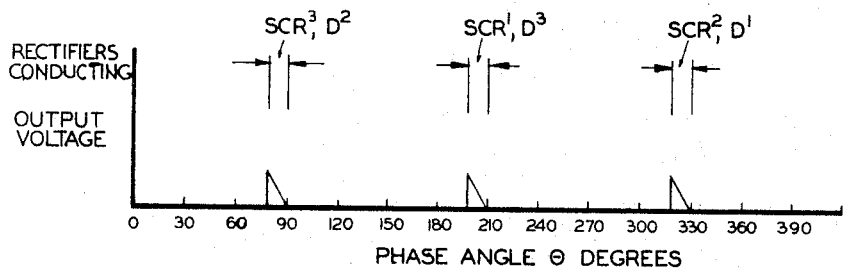
Figure 7:
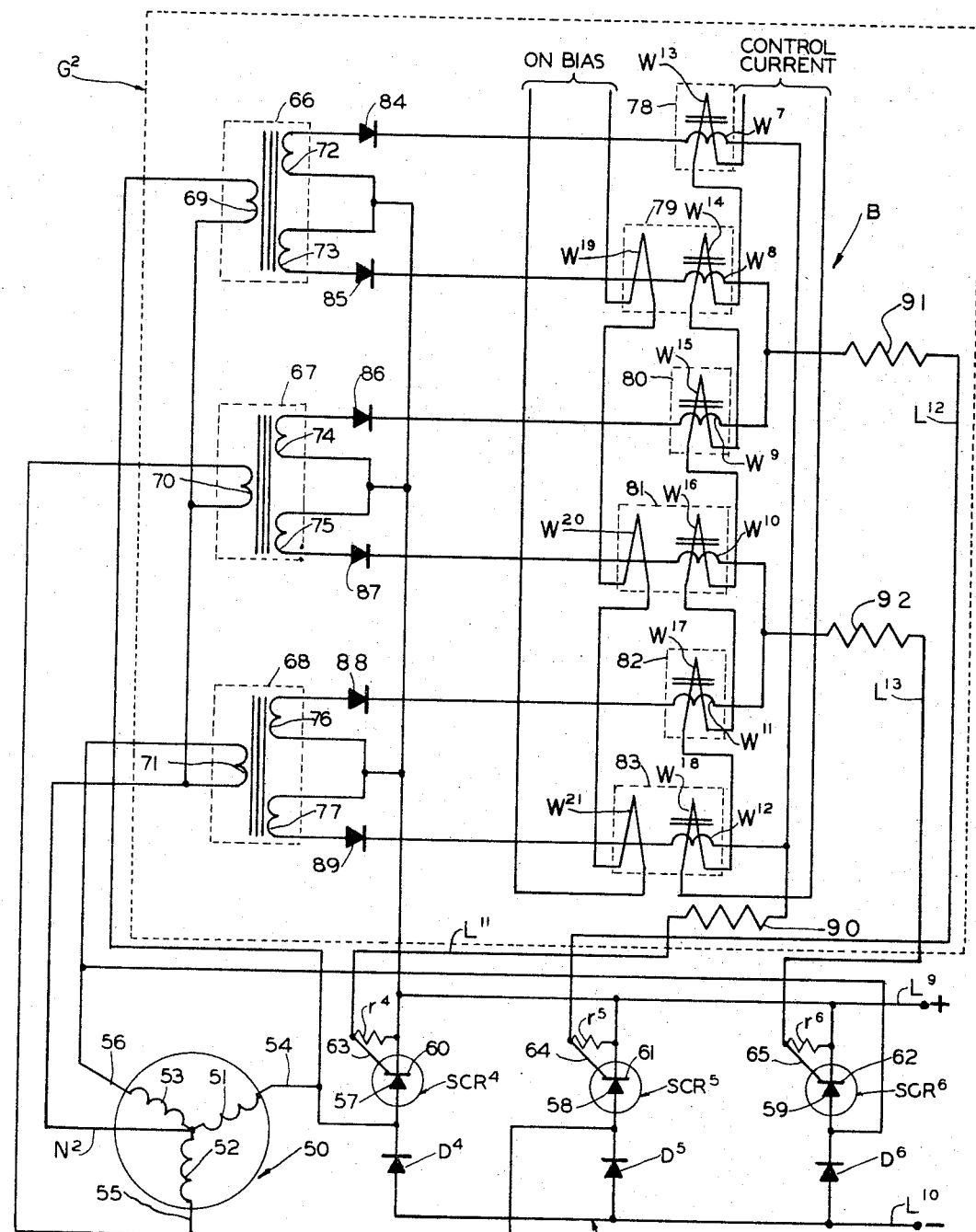
Figures 8, 14:
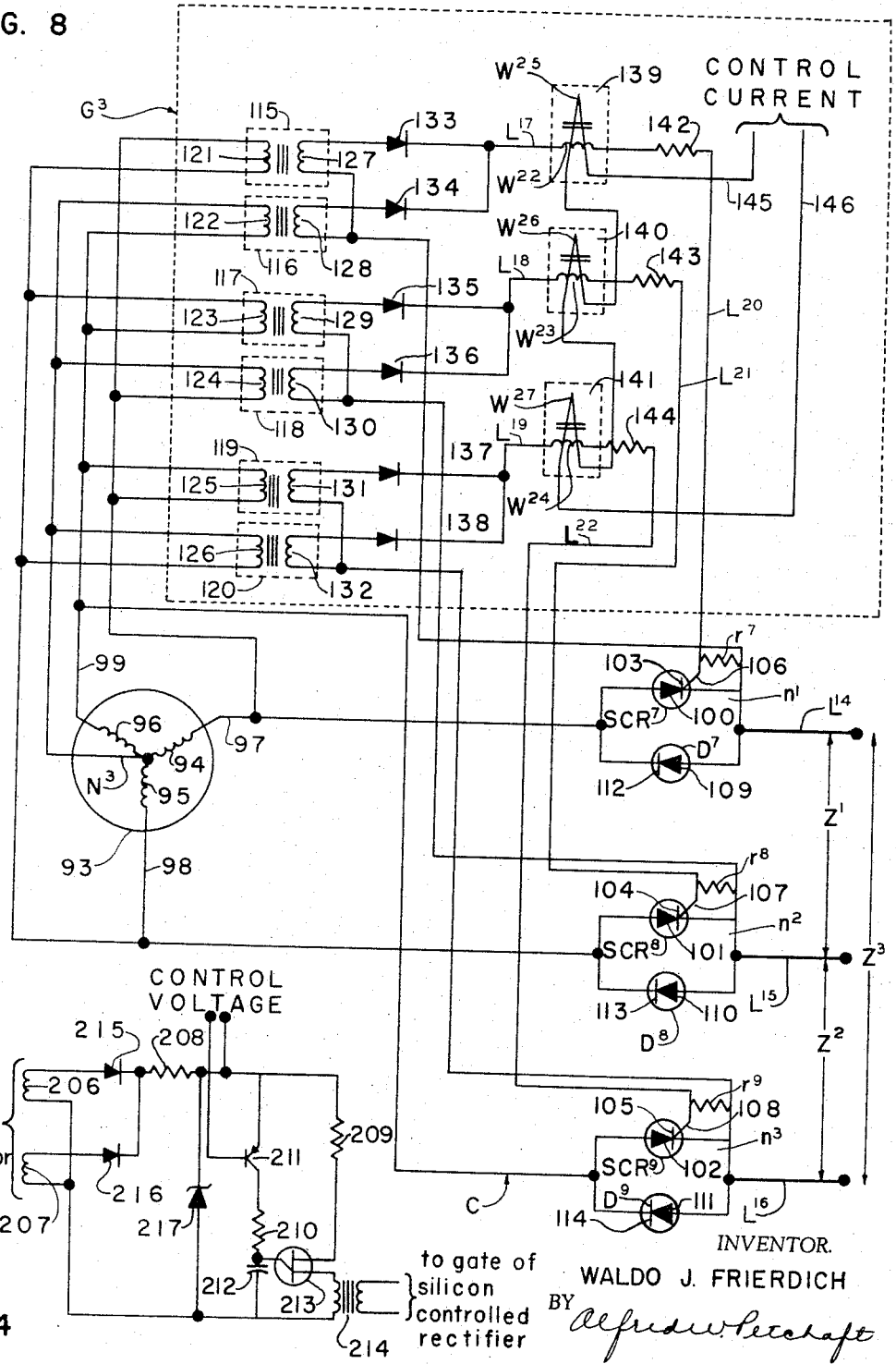
Figure 11:
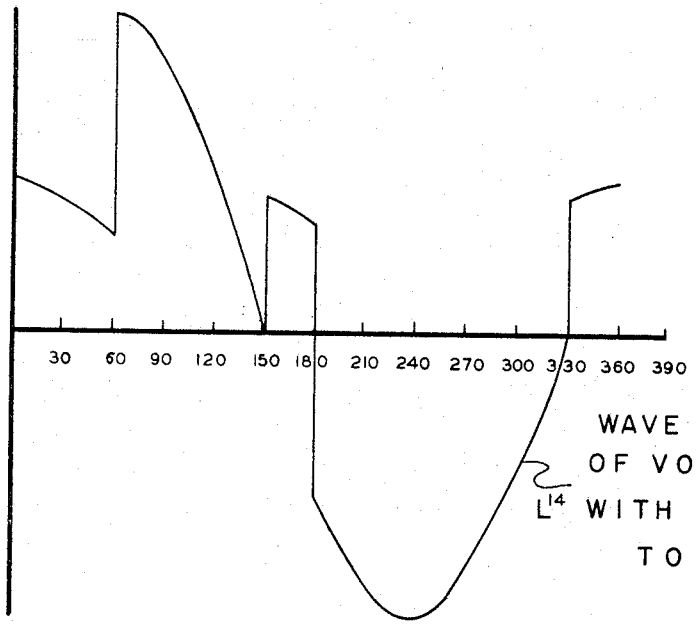
Figure 12:
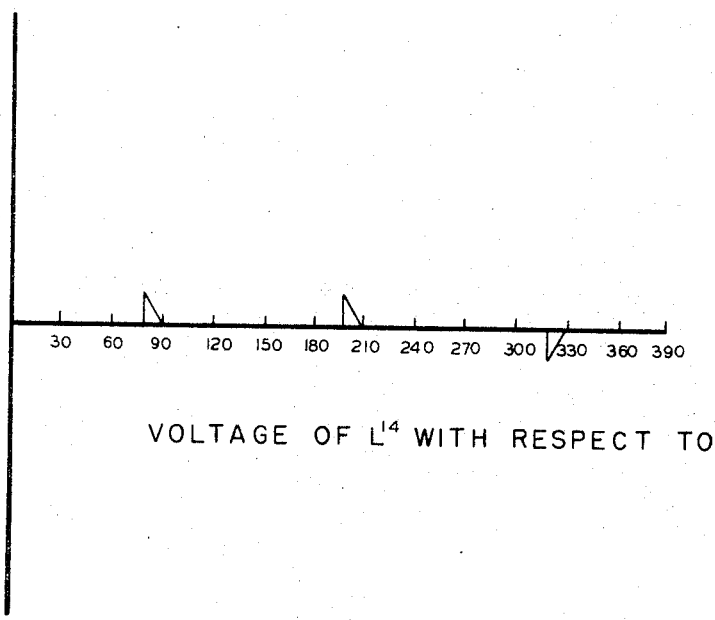
Figure 13:
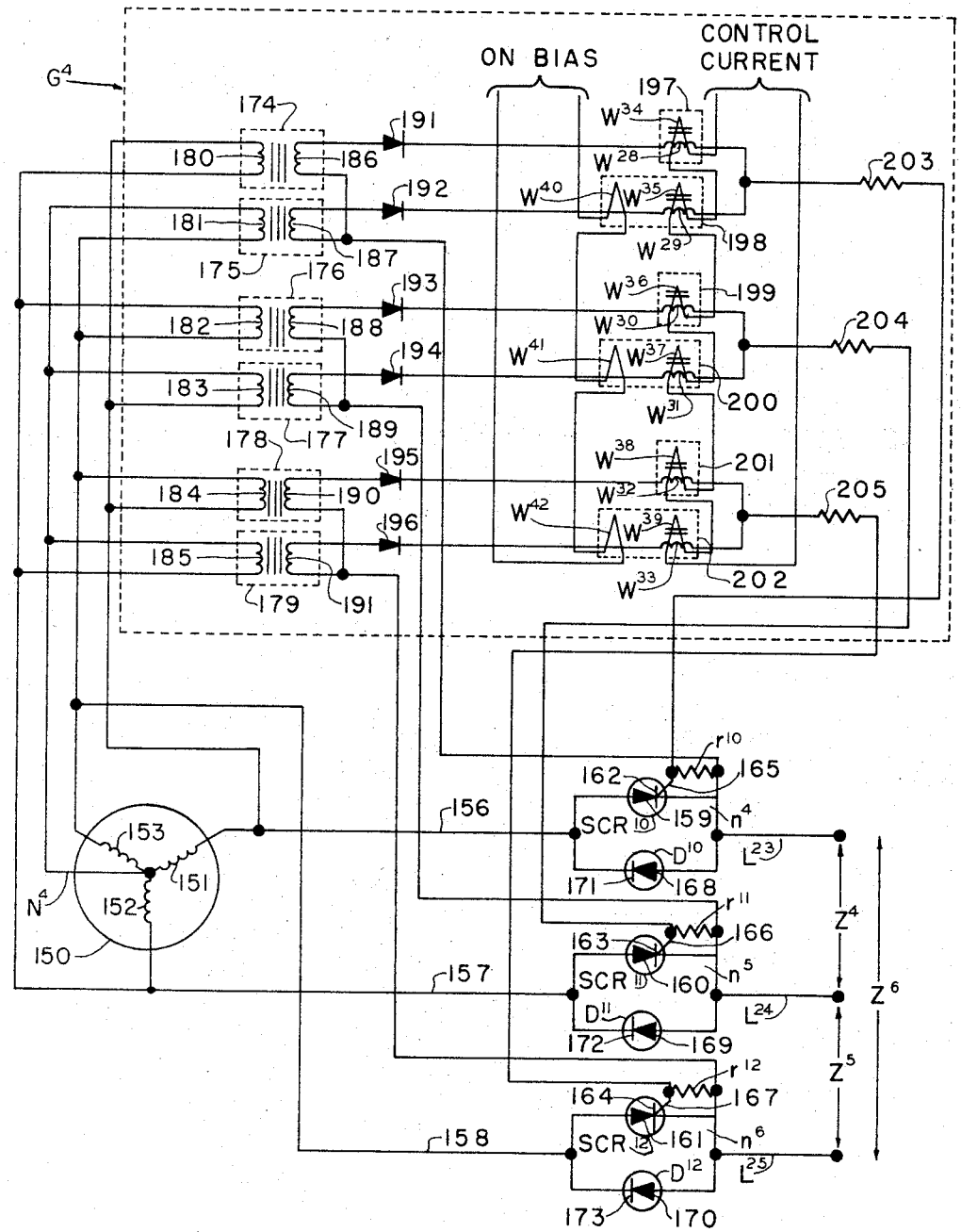

FIGS. 4, 5, and 6, are diagrammatic graphs of various output voltages which may be obtained from three-phase controlled rectifier bridge converters under various conditions assumed for explanatory purposes;

FIG. 7 is a circuit diagram of a modified form of converter constructed in accordance with and embodying the present invention;

FIG. 8 is a circuit diagram of an A.C. power controlling device constructed in accordance with and embodying the present invention;

FIG. 9 is a typical graph of the generator output voltages in a modified form of the present invention, said voltages being plotted in reference to phase angle;

FIGS. 10, 11, and 12, are diagrammatic graphs of various output voltages which may be obtained from the A.C. power controlling device shown in FIG. 8 under various conditions assumed for explanatory purposes;

FIG. 13 is a circuit diagram of a modified form of A.C. power controlling device constructed in accordance with the present invention; and FIG. 14 is a diagrammatic view of a modified form of signal controlling circuit forming a part of the present invention.

Generally speaking, the present invention resides in unique means for triggering controlled rectifiers into a conductive state at controllable phase angles. By controlling the initiation of the trigger signal, it is possible to control the power output of an electrical power handling device.

Figure 1:
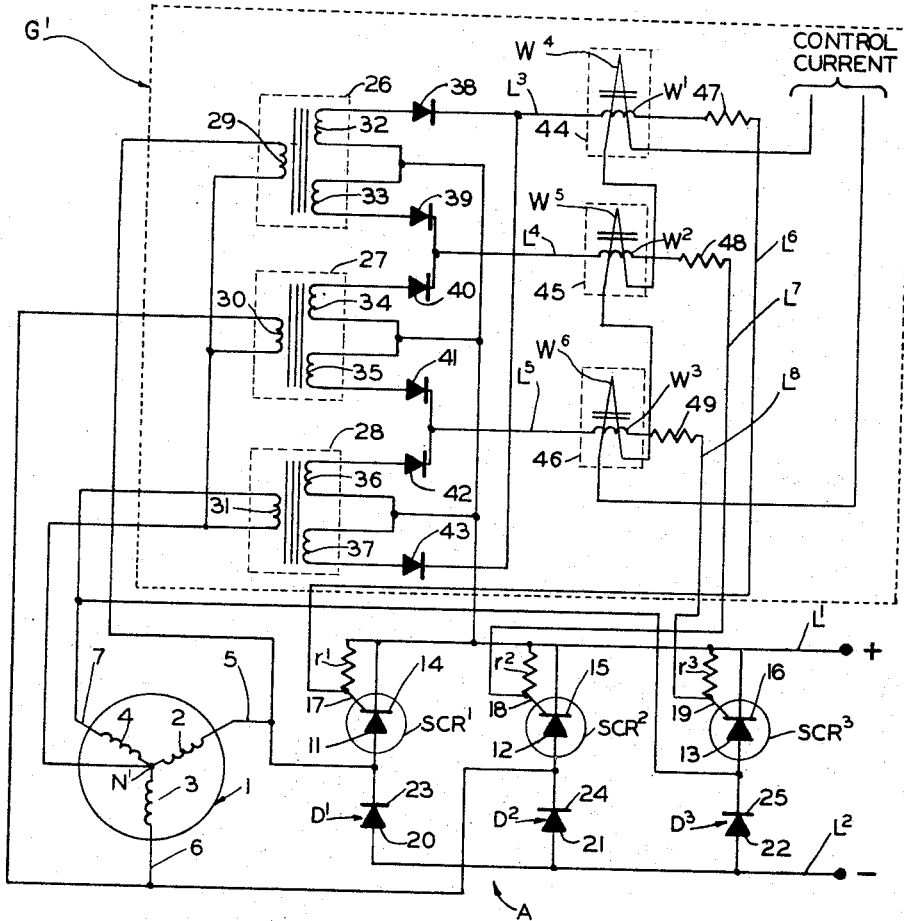
FIG. 1 is a schematic view of a three-phase rectifier converter constructed in accordance with and embodying the present invention.

Referring now in more detail and by reference characters to the drawings, which illustrate practical embodiments of the present invention. A designates a three-phase controlled rectifier bridge converter for use with a conventional three-phase generator 1 which constitutes the A.C. power source and includes three windings or coils 2, 3, 4, connected in a Y-configuration to output lines 5, 6, 7, and a neutral line $N^1$, respectively, as shown in FIG. 1. It is possible to use a "delta" connection for connecting the windings 2, 3, 4, but the Y-configuration is preferred by the industry because of the usefulness of the neutral point and, therefore, the present invention is described in such configuration. It will also be understood by those familiar with electrical power controlling and handling devices that the circuitry herein discussed can be connected to a three-phase line supplied either directly or through transformers and transmission lines from a remote generator.

Connected to the three-phases are three silicon controlled rectifiers $SCR^1$, $SCR^2$, $SCR^3$, respectively, consisting of anodes 11, 12, 13, cathodes 14, 15, 16, and gates 17, 18, and 19. Also connected to the three-phases, as shown in FIG. 1, are three semi-conductor diodes $D^1$, $D^2$, $D^3$, respectively having anodes 20, 21, 22, and cathodes 23, 24, 25. The anode 11 is connected to the cathode 23, the anode 12 is connected to the cathode 24, and the anode 13 is connected to the cathode 25. Moreover, the three last-mentioned connections are connected to the generator output lines 5, 6, 7, respectively. Similarly, the cathodes 14, 15, 16, are connected in common to line $L^1$, which is, in turn, connected to the positive D.C. output terminal while the anodes 20, 21, 22, are connected in common to line $L^2$, which is, in turn, connected to the negative D.C. output terminal. Resistors $r^1$, $r^2$, $r^3$, are respectively connected between gates 17, 18, 19, and the line $L^1$ for preventing aberrant triggering of $SCR^1$, $SCR^2$, $SCR^3$, due to leakage currents.

The signal generating circuit $G^1$ includes three transformers 26, 27, 28, having primary windings 29, 30, 31, each of which has one terminal connected to the generator output lines 5, 6, 7, respectively. The other terminals of the primary windings 29, 30, 31, are connected in common to the neutral line $N^1$ of the generator 1. If, for some reason, a delta connected generator is used, then an artificial neutral can be established by any one of several known and conventional methods.

The transformers 26, 27, 28, each include a pair of secondary windings 32–33, 34–35, 36–37, as shown in FIG. 1. The pairs of windings 32–33, 34–35, 36–37, each have a common connection in the nature of a center tap and all of the center taps are connected in common to the D.C. output line $L^1$. The opposite terminals of each of the pairs of transformer windings 32–33, 34–35, and 36–37, are respectively connected to the anodes of diodes 38, 39, 40, 41, 42, and 43, the cathodes of which are joined in pairs, as shown in FIG. 1, and connected to signal-circuit lines $L^3$, $L^4$, $L^5$.

The signal generating circuit $G^1$ also includes saturable reactors 44, 45, 46, having gate windings $w^1$, $w^2$, $w^3$, respectively, which are connected at one end, as shown in FIG. 1, to the signal-circuit lines $L^3$, $L^4$, $L^5$. The other ends of the gate windings $w^1$, $w^2$, $w^3$, are connected in series with current-limiting resistors 47, 48, 49, to signal-output lines $L^6$, $L^7$, $L^8$, which are, in turn, connected to the gates 17, 18, 19, of the silicon controlled rectifiers $SCR^1$, $SCR^2$, $SCR^3$, respectively. Finally, the saturable reactors 44, 45, 46, are respectively provided with control windings $w^4$, $w^5$, $w^6$, which are connected in series, as shown in FIG. 1, to a conventional source of control current.

In order to understand the operation of the converter A, it is necessary to be familiar with the characteristics of a silicon controlled rectifier. A silicon controlled rectifier is similar to a conventional diode in that current flows through it in only one direction; it flows from anode to cathode when the anode voltage is positive with respect to that of the cathode. However, when a positive voltage is applied to the anode of a silicon controlled rectifier, it will not conduct until the gate terminal of the silicon controlled recifier is made positive with respect to the cathode terminal. Anode-to-cathode current will continue to flow in the silicon controlled rectifier after the gate cathode voltage returns to zero. Current continues to flow until the anode-to-cathode voltage is reduced to zero or reversed.

The operation of the three-phase controlled rectifier bridge converter may be explained by initially considering only the three-phase output lines 5, 6, 7, of the A.C. generator 1, the silicon controlled rectifiers $SCR^1$, $SCR^2$, $SCR^3$, the diodes $D^1$, $D^2$, $D^3$, and the D.C. output lines $L^1$, $L^2$, or in other words, the circuitry constituting the lower portion of FIG. 1. If, for the purpose of explanation, it be assumed that a D.C. signal voltage of adequate strength be continuously applied to gates 17, 18, 19, and that three-phase voltages exist between generator output lines 5, 6, 7, then an output voltage will appear across converter output lines $L^1$ and $L^2$. This output voltage will have the waveform shown in FIG. 4.

For the conditions assumed above, each silicon controlled rectifier and each diode conducts sequentially for one-third of a period of the sine wave, i.e. for 120 electrical degrees.

Figure 2:
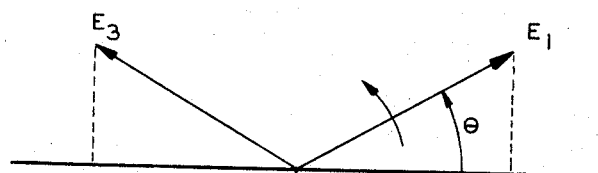
FIG. 2 is a phasor diagram of the output voltages of the three-phase A.C. generator which supplies the power being converted.

By reference to the phasor diagram, FIG. 2, it will be seen that the generator 1 produces output voltages which can be represented by the phasors $E^1$, $E^2$, $E^3$. For example, the phasor $E^1$ is representative of the magnitude and phase angle of the voltage in the winding 2. The phasor $E^2$ is representative of the magnitude and phase angle of the voltage winding 3 and the phasor $E^3$ is representative of the magnitude and phase angle of the voltage in the winding 4.

For example, in FIG. 2 the vertical component of $E^1$ has just become equal to that of $E^3$. At this time, the anodes of silicon controlled rectifiers $SCR^1$ and $SCR^3$ are equally positive, but an instant later the anode of silicon controlled rectifier $SCR^1$ becomes more positive. Therefore, current flows through silicon controlled rectifiers $SCR^1$ into line $L^1$, through an external load (not shown) and returns through line $L^2$ and diode $D^2$ whose cathode among the three diodes is the most negative. This is evident in FIG. 2 from the fact that phasor $E^2$ has greatest vertical component below the origin.

Output current continues to flow in silicon controlled rectifier $SCR^1$ until $\theta$ reaches 150° at which time it flows through silicon controlled rectifier $SCR^2$. FIG. 4 reveals which diode and which silicon controlled rectifier is conducting it throughout the cycle.

If, instead of applying a continuous signal voltage to the gates of the silicon controlled rectifiers, the gates of the silicon controlled rectifiers $SCR^1$, $SCR^2$, and $SCR^3$, are supplied with a positive pulse at $\theta=30°$, 150° and 270°, respectively, operation would still be as previously described. However, if the gate signals to the silicon controlled rectifiers $SCR^1$, $SCR^2$, and $SCR^3$, are not applied until $\theta=60°$, 180° and 300°, respectively, the output voltage across lines $L^1$ and $L^2$ will have the waveform shown in FIG. 5. Furthermore, if the gate signals are applied as before at $\theta=200°$, 320° and 80°, the output will be as shown in FIG. 6. Finally, if the gate signals are delayed ten degrees more, the output of the converter is reduced to zero.

It is, therefore, apparent that the output voltage of the converter can be controlled from maximum to zero by varying the application of the gate signal over a range of 180°. Furthermore, the 180° range must be properly related to the phase of the silicon controlled rectifiers' anode voltage. For instance, the range of gate signal for silicon controlled rectifier $SCR^1$ is $\theta=30°$ for maximum and $\theta=210°$ for minimum converter output.

Figure 3:
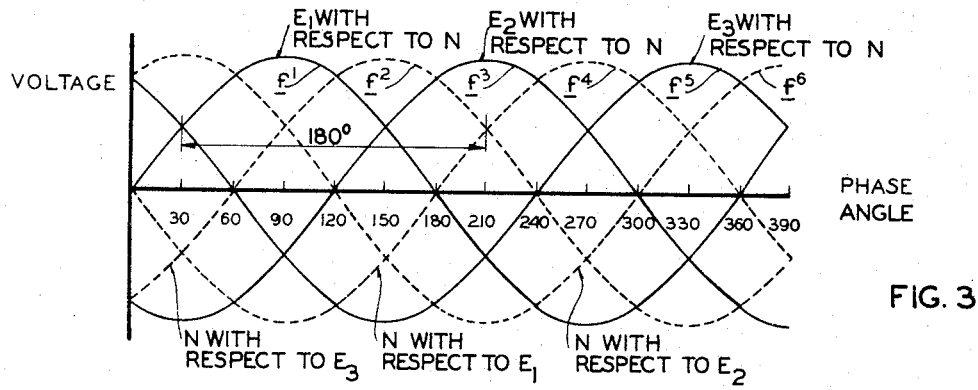
FIG. 3 is a typical graph of the A.C. generator output voltages plotted in relation to phase angles.

Such input triggering voltages for the silicon controlled rectifiers $SCR^1$, $SCR^2$, $SCR^3$, can be represented by the waveforms in FIG. 3. The waveform $f^1$ is actually a measurement of the time-varying magnitude of the voltage of generator output line 5 with respect to neutral and the waveform $f^2$ represents the time-varying magnitude of the voltage of neutral with respect to voltage of generator output line 7. It can be seen that at the 30° and 210° points, the magnitude of the voltage is substantial and is more than adequate for triggering purposes. Referring again to FIG. 3, it can be seen that the waveform $f^3$ represents the value of the time-varying magnitude of the voltage on the output line 6 with respect to the neutral and waveform $f^4$ represents the voltage of neutral with respect to the output line 5. Finally, the wavefore $f^5$ represents the time-varying magnitude of the voltage on the output line 7 with respect to neutral and waveform $f^6$ represents the voltage of neutral with respect to line 6. By utilizing the phase voltages of waveforms $f^1$, $f^2$, so that the signal is the maximum voltage of either waveform whichever is the greater at any instant, ample power is, therefore, available to trigger the silicon controlled rectifier $SCR^1$. Similarly, by utilizing the voltage outputs of waveforms $f^3$, $f^4$, so that the signal is the maximum voltage of either waveform whichever is the greater at any instant, sufficient voltage is provided to trigger silicon controlled rectifier $SCR^2$. By utilizing the phase voltages of waveforms $f^5$, $f^6$, so that the signal is the maximum voltage of either waveform whichever is the greater at any instant, sufficient phase voltage is provided to trigger silicon controlled rectifier $SCR^3$. In other words, the signal generator supplies power for each gate from two sources of sine wave A.C. voltage. Finally, by initiating these signals at a selected time in the cycle, the magnitude of D.C. output can be varied from zero to maximum. For example, FIGS. 4, 5, and 6, respectively, show the full, partial and near-minimum output voltages which can be supplied to the output lines $L^1$ and $L^2$, across which any suitable load may be connected.

Thus, it is possible to develop signal voltages having adequate power across the full range of phase angles to trigger the silicon controlled rectifiers $SCR^1$, $SCR^2$, $SCR^3$. For example, the gate 17 of the silicon controlled rectifier $SCR^1$ is supplied with a signal from the secondary windings 32, 37, of the transformers 26, 28, respectively, and diodes 38, 43. The current will flow to this gate 17 at some phase angle between zero and 240°. This phase angle, at which the voltage is applied to the silicon controlled rectifier SCR¹, is dependent upon the amount of current in the control winding $w^4$ of the saturable reactor 44. This signal is modified as it passes through gate winding $w^1$ which absorbs the initial portion of the signal but passes the remainder of the signal to initiate conduction in silicon controlled rectifier SCR¹. The number of electrical degrees during which the signal is absorbed is a function of the amplitude of the control current through control winding $w^4$. Similarly, a signal will be supplied to the gate 18 of the silicon controlled rectifier SCR² through the windings 33, 34, of transformers 26, 27, respectively, and diodes 39, 40. This signal will flow to the gate 18 at a phase angle which is dependent upon the amount of current in the control winding $w^5$ of the saturable reactor 45 and is modified as it passes through gate winding $w^2$ in the same same manner as the signal passing through gate winding $w^1$. Finally, a signal will be supplied to the gate 19 of the silicon controlled rectifier SCR³ through the windings 35, 36, of transformers 27, 28, respectively, and diodes 41, 42. This signal will flow to the gate 19 at some phase angle which is dependent upon the amount of current in the control windings $w^6$ of the saturable reactor 46. This latter signal is also modified as it passes through gate winding $w^3$ in the same manner as the signal passing through gate winding $w^1$.

It is possible to provide a modified form of three-phase bridge rectifier converter B, substantially as shown in FIG. 7, comprising a three-phase A.C. generator 50 having windings 51, 52, 53, which are connected in Y-configuration to output lines 54, 55, 56, and neutral line $N^2$. Connected to the three-phases are three silicon controlled rectifiers SCR⁴, SCR⁵, SCR⁶, which are substantially identical to the previously described rectifiers SCR¹, SCR², SCR³, respectively, consisting of anodes 57, 58, 59, cathodes 60, 61, 62, and gates 63, 64, 65. Interposed between the cathodes 60, 61, 62, and the gates 63, 64, 65 respectively, are resistors $r^4$, $r^5$, $r^6$, which are similar in function to the resistors $r^1$, $r^2$, $r^3$. The cathodes 60, 61, 62, are connected in common to power output line $L^9$. Also connected to the three-phases, as shown in FIG. 7, are three semi-conductor diodes D⁴, D⁵, D⁶, the anodes of which are connected in common to power output line $L^{10}$.

The signal generating circuit G² includes transformers 66, 67, 68, which are substantially identical to the previously described transformers 26, 27, 28, and respectively include primary windings 69, 70, 71. Moreover, the transformers 66, 67, 68, each include pairs of secondary windings 72–73, 74–75, 76–77, which are respectively connected to saturable reactors 78, 79, 80, 81, 82, 83, through diodes 84, 85, 86, 87, 88, 89, and gate windings $w^7$, $w^8$, $w^9$, $w^{10}$, $w^{11}$, $w^{12}$, as shown in FIG. 7. Three signal output lines $L^{11}$, $L^{12}$, $L^{13}$, are provided with resistors 90, 91, 92, which serve substantially the same function as the previously described resistors 47, 48, 49. The signal lines $L^{11}$, $L^{12}$, $L^{13}$, are connected to the gates 63, 64, 65, of the silicon controlled rectifiers SCR⁴, SCR⁵, SCR⁶, respectively, whereby to supply triggering signals thereto. The saturable reactors 78, 79, 80, 81, 82, 83, are respectively provided with control windings $w^{13}$, $w^{14}$, $w^{15}$, $w^{16}$, $w^{17}$, $w^{18}$. In this manner, a smaller amount of control current is required to reset the magnetic state of the saturable reactors than is required for the saturable reactors in the signal generating circuit G¹. The saturable reactors 79, 81, and 83, are respectively provided with bias windings $w^{19}$, $w^{20}$, $w^{21}$, in order to delay the retarding action in these reactors. In this signal generating circuit G², the resetting action of the saturable reactors 79, 81, 83, can be carried out over a phase-range of 180° as distinguished from the previously described signal generating circuit G¹ in which the saturable reactors 44, 45, 46, must be reset within a phase-range of 120°.

It is also possible, in accordance with the present invention, to provide an A.C. power controlling device C, as shown in FIG. 8, for use with a conventional three-phase generator 93 which constitutes the A.C. power source and includes three windings or coils 94, 95, 96, connected in a Y-configuration to output lines 97, 98, 99, respectively, and having a neutral line $N^3$.

Interposed in the three-phases, as shown in FIG. 8, are three identical rectifier-diode networks $n^1$, $n^2$, $n^3$, including silicon controlled rectifiers SCR⁷, SCR⁸, SCR⁹, respectively consisting of anodes 100, 101, 102, cathodes 103, 104, 105, and gates 106, 107, 108. Also included within the networks $n^1$, $n^2$, $n^3$, respectively are three semi-conductor diodes D⁷, D⁸, D⁹, respectively having anodes 109, 110, 111, and cathodes 112, 113, 114. The anode 100 is connected in common with the cathode 112 to generator output line 97. The anode 101 is connected in common with the cathode 113 to the generator output line 98, and the anode 102 is connected in common with the cathode 114 to the generator line 99. Similarly, the cathode 103 and anode 109 are connected in common to the A.C. output line $L^{14}$. The cathode 104 and the anode 110 are connected in common to the A.C. output line $L^{15}$. The cathode 105 and anode 111 are connected in common to the A.C. output line $L^{16}$. The controlled A.C. power is supplied from the lines $L^{14}$, $L^{15}$, $L^{16}$ to loads $Z^1$, $Z^2$, $Z^3$, which should be substantially balanced loads.

The signal generating circuit G³ which is similar to the previously described signal generating circuits G¹ and G², includes six transformers 115, 116, 117, 118, 119, 120, having primary windings 121, 122, 123, 124, 125, 126, each of which are connected to the generator output lines 97, 98, 99, and neutral line $N^3$, respectively, as shown in FIG. 8. The transformers 115, 116, 117, 118, 119, 120, each include a secondary winding 127, 128, 129, 130, 131, 132, which are also connected as shown in FIG. 8 to the anodes of diodes 133, 134, 135, 136, 137, 138, the cathodes of which are paired and connected to signal-circuit lines $L^{17}$, $L^{18}$, $L^{19}$.

The signal generating circuit G³ also includes saturable reactors 139, 140, 141, having gate windings $w^{22}$, $w^{23}$, $w^{24}$, respectively, which are connected at one end, as shown in FIG. 8, to the signal-circuit lines $L^{17}$, $L^{18}$, $L^{19}$. The other ends of the gate windings $w^{22}$, $w^{23}$, $w^{24}$, are connected in series with resistors 142, 143, 144, to signal-output lines $L^{20}$, $L^{21}$ $L^{22}$, which are, in turn, connected to the gates 106, 107, 108, of the silicon controlled rectifiers SCR⁷, SCR⁸, SCR⁹, respectively. Resistors $r^7$, $r^8$, $r^9$, are connected from gate to cathode of silicon controlled rectifiers SCR⁷, SCR⁸, SCR⁹, respectively, and serve substantially the same purpose as the previously described resistors $r^1$, $r^2$, $r^3$, or $r^4$, $r^5$, $r^6$. Finally, the saturable reactors 139, 140, 141, are respectively provided with control windings $w^{25}$, $w^{26}$, $w^{27}$, which are connected in series through lines 145, 146, as shown in FIG. 8 to a conventional source of bias control current.

FIG. 9 shows the phase relation of voltages that exist between certain output lines of the generator 93. The waveform $f^7$ is that of the voltage on line 97 with respect to line 98 as a function of phase angle $\theta$ which progresses uniformly with time. Waveform $f^8$ represents the voltage on line $N^3$ with respect to line 99. Waveform $f^9$ represents the voltage on line 98 with respect to line 99. Waveform $f^{10}$ represents the voltage on line $N^3$ with respect to line 97. Waveform $f^{11}$ represents the voltage on line 99 with respect to line 97. Finally, $f^{12}$ represents the voltage on line $N^3$ with respect to line 98.

For the purpose of explanation, assume that the loads $Z^1$, $Z^2$, $Z^3$, are of approximately equal value. Furthermore, assume that the gates of each of the silicon controlled rectifiers SCR⁷, SCR⁸, SCR⁹, are adequately biased positive so each silicon controlled rectifier SCR⁷, SCR⁸, SCR⁹, will conduct whenever its anode becomes positive with respect to its cathode. The A.C. output voltages of the generator 93 that appear between the lines $L^{14}$, $L^{15}$, $L^{16}$, are shown in FIG. 10. These output voltages, except for a drop in the rectifiers of about one volt, are identical to the input voltages supplied to the generator output lines 97, 98, and 99. Careful analysis reveals that $\theta=0°$, a current from line 99 passes through silicon controlled rectifier SCR$^9$ and returns to the generator output line 98 through diode D$^8$. Approximately one-third of this current passes through Z$^3$ and Z$^1$. Due to these current relations at this instant, the anode of silicon controlled rectifier SCR$^7$ just becomes positive with respect to its cathode and current starts to flow through silicon controlled rectifier SCR$^7$. Current continues to flow into silicon controlled rectifier SCR$^7$ until $\theta=180°$. In the same manner, current flows in the silicon controlled rectifier SCR$^8$ from $\theta=120°$ to $\theta=240°$ and through the silicon controlled rectifier SCR$^9$ from $\theta=240°$ to $\theta=360°$.

If instead of supplying the gates of the silicon controlled rectifiers SCR$^7$, SCR$^8$, SCR$^9$, with a constant D.C. bias, the gates of the silicon controlled rectifiers SCR$^7$, SCR$^8$, SCR$^9$, are supplied with a positive pulse at $\theta=0°$, 120°, and 240°, respectively, the output waveform will be substantially as shown in FIG. 10.

If the gate pulses are supplied to the gates of the silicon controlled rectifiers SCR$^7$, SCR$^8$, SCR$^9$, at $\theta=60°$, 180°, and 300°, the output waveform will be changed. FIG. 11 shows the waveform of the output voltage on line L$^{14}$ with respect to line L$^{15}$. The waveform of the voltages of line L$^{15}$ with respect to line L$^{16}$ is the same as that as shown in FIG. 11, but delayed by 120°. The waveform of the voltage on line L$^{16}$ with respect to line L$^{14}$ is the same as that shown in FIG. 11 but is delayed by 240°. The amount of power supplied to the load impedances is less when the gate pulses are delayed as described above.

If the gate pulses are further delayed so that the gates of the silicon controlled rectifiers SCR$^7$, SCR$^8$, SCR$^9$, receive positive pulses at 210°, 330°, and 80°, respectively, the waveforms of the output voltages will be further altered. FIG. 12 shows the waveform of the voltage of output line L$^{14}$ with respect to line L$^{15}$. The voltage of line L$^{15}$ with respect to line L$^{16}$ and of line L$^{16}$ with respect to line L$^{14}$ have the same waveforms as that shown in FIG. 12, but are delayed 120° and 240°, respectively, with respect to those shown.

Obviously, the power output of the power controlling device C decreases as the gate pulses are delayed. In fact, if the gate pulses are delayed anothed 10°, the output of the controlling device C will drop to zero.

It follows then that if the pulses supplied to the silicon controlled rectifiers SCR$^7$, SCR$^8$, SCR$^9$, can be varied over phase ranges of 0 to 210°, 120° to 330°, and 240° to 90°, respectively, power output of the A.C. controlling device C can be varied from maximum to zero.

Referring to FIG. 9, it should be noted that the waveforms $f^7$ and $f^8$ have an amplitude of at least one-half their peak values over the phase range of 0° to 210°. Hence, two voltages having phases identical to $f^7$ and $f^8$ are used as a source for the gate signals supplied to silicon controlled rectifier SCR$^7$. These voltages are supplied by secondary windings 127, 128, of FIG. 8 through diodes 133 and 134 and through the gate winding $w^{22}$ of the saturable reactor 139 and resistor 142 to the gate terminal of the silicon controlled rectifier SCR$^7$. Gate signals for the other two silicon controlled rectifiers SCR$^8$, SCR$^9$, are obtained in a similar manner as shown in FIG. 8.

As the gate signals pass through the gate windings $w^{22}$, $w^{23}$, $w^{24}$, of the saturable reactors 139, 140, 141, an initial portion of each signal is absorbed by the corresponding gate winding while the remainder passes on to the gate of the silicon controlled rectifier with which it is associated. The amount of signal that is absorbed is a function of the current flowing in the respective control windings $w^{25}$, $w^{26}$, and $w^{27}$.

It is also possible in accordance with the present invention to provide an A.C. power controlling device D as shown in FIG. 12 for use with a conventional three-phase generator 150 which constitutes the A.C. power source and includes three windings or coils 151, 152, 153, connected in a Y-configuration to output lines 156, 157, 158, respectively, and having a neutral line N$^4$.

Interposed in the three-phases are three identical rectifier-diode networks $n^4$, $n^5$, $n^6$, including silicon controlled rectifiers SCR$^{10}$, SCR$^{11}$, SCR$^{12}$, respectively consisting of anodes 159, 160, 161, cathodes 162, 163, 164, and gates 165, 166, 167. Also included within the networks $n^4$, $n^5$, $n^6$, respectively, are three semi-conductor diodes D$^{10}$, D$^{11}$, D$^{12}$, respectively having anodes 168, 169, 170, and cathodes 171, 172, 173. The anode 159 is connected in common with the cathode 171 to generator output line 156 The anode 160 is connected in common with the cathode 172 to the generator output line 157, and the anode 161 is connected in common with the cathode 173 to the generator line 158. Similarly, the cathode 162 and anode 168 are connected in common to the A.C. output line L$^{23}$. The cathode 163 and anode 169 are connected in common to the A.C. output line L$^{24}$. The cathode 164 and anode 170 are connected in common to the A.C. output L$^{25}$. The controlled A.C. power is supplied from the lines L$^{23}$, L$^{24}$, L$^{25}$, to balanced loads Z$^4$, Z$^5$, Z$^6$.

The signal generating circuit G$^4$ which is similar to the previously described signal generating circuit G$^2$ includes six transformers 174, 175, 176, 177, 178, 179, having primary windings 180, 181, 182, 183, 184, 185, each of which is connected to the generator output lines 156, 157, 158, and neutral line N$^4$, respectively. The transformers 174, 175, 176, 177, 178, 179, each include secondary windings 186, 187, 188, 189, 190, 191, which are also connected as shown in FIG. 13 to the anodes of diodes 191, 192, 193, 194, 195, 196, the cathodes of which are respectively connected through gate windings $w^{28}$, $w^{29}$, $w^{30}$, $w^{31}$, $w^{32}$, $w^{33}$, of saturable reactors 197, 198, 199, 200, 201, 202, to resistors 203, 204, 205, as shown in FIG. 13, whereby to supply power to the gates 165, 166, 167, of the silicon controlled rectifiers SCR$^{10}$, SCR$^{11}$, SCR$^{12}$, respectively. The resistors 203, 204, 205, are substantially similar in function to the resistors 47, 48, 49. Resistors $r^{10}$, $r^{11}$, $r^{12}$, are connected from gate to cathode of silicon controlled rectifiers SCR$^{10}$, SCR$^{11}$, SCR$^{12}$, respectively, and serve substantially the same purpose as the previously described resistors $r^1$, $r^2$, $r^3$, or $r^4$, $r^5$, $r^6$. The saturable reactors 197, 198, 199, 200, 201, 202 are respectively provided with control windings $w^{34}$, $w^{35}$, $w^{36}$, $w^{37}$, $w^{38}$, $w^{39}$. In this manner, a smaller amount of control current is required to reset the magnetic state of the saturable reactors than is required for the saturable reactors in the signal generating circuit G$^3$. The saturable reactors 198, 200, 202 are respectively provided with bias windings $w^{40}$, $w^{41}$, $w^{42}$, in order to delay retarding action in these reactors. In this signal generating circuit G$^4$, the resetting action of the saturable reactors 198, 200, 202, can be carried out over a phase-range of 180° as distinguished from the previously described signal generating circuit G$^3$ in which the saturable reactors 139, 140, 141, must be reset within a phase-range of 90°.

Instead of using saturable reactors as previously described, it is also possible to employ uni-junction transistor circuits of which FIG. 14 is a typical wiring diagram. As shown, the windings 206, 207 are intended to represent the dual secondaries of the transformers connected to the A.C. generator output lines, i.e. the transformers 26, 27, 28, of FIG. 1, the transformers 66, 67, 68, of FIG. 7, or the separate secondaries of the transformers 115, 116, 117, 118, 119, 120, of FIG. 8, or the transformers 174, 175, 176, 177, 178, 179, of FIG. 13. Each such uni-junction transistor circuit includes resistors 208, 209, 210, a transistor 211, a condenser 212, a uni-junction transistor 213, a small signal-output transformer 214, and diodes 215, 216, and zener diode 217, connected as shown in FIG. 14. By application of suitable control voltage, a triggering signal can be transmitted to the gate of a silicon controlled rectifier in the same manner as previously described, and the value of θ at the time such signal is transmitted will similarly control the ultimate output of the power device being controlled.

It should be understood that changes and modifications in the form, construction, arrangement, and combination of the several parts of the signal generator and electrical power device employing such signal generator may be made and substituted for those herein shown and described without departing from the nature and principle of my invention.

Having thus described my invention, what I claim and desire to secure by Letters Patent is:

1. A power control system for use with a source of polyphase A.C. power, said system comprising:
   a plurality of silicon controlled rectifiers for varying the power supplied by the system to a load in response to variations in the phase angle at which said rectifiers are triggered;
   a triggering circuit for each silicon controlled rectifier, each triggering circuit being responsive to the application of a voltage thereto for triggering the respective rectifier in timed relation to the application of said voltage, said triggering circuit including means for adjusting the time of triggering with respect to the time of application of said voltage for varying the phase angle at which the respective rectifier is triggered;
   means for obtaining from said source at least a pair of A.C. voltages for each triggering circuit which are shifted in phase with respect to each other; and
   rectifier means for applying to each triggering circuit whichever of the respective pair of A.C. voltages is instantaneously greater whereby a voltage of sufficient magnitude to produce rectifier triggering is applied to each triggering circuit for substantially more than 180° of each A.C. source cycle and the firing angle of said rectifier may be varied over substantially 180° of each source cycle for controlling the power supplied to said load between approximately zero and maximum.

2. A power control system as set forth in claim 1 wherein the means for adjusting the time of triggering includes a saturable reactor.

3. A power control system as set forth in claim 1 wherein the means for adjusting the time of triggering includes a uni-junction transistor timing circuit.

4. A power control system as set forth in claim 1 wherein said system includes a bridge rectifier for converting A.C. from said source to D.C., said bridge comprising six rectifiers at least three of which are said silicon controlled rectifiers.

5. A power control system as set forth in claim 1 wherein said source provides three phase A.C. and said system includes output line means for applying three phase A.C. to said load, said silicon controlled rectifiers being interconnected between said source and said output line means for varying the A.C. power applied to said load.

6. An electrical power device comprising in combination a three phase source of alternating current having three supply conductors corresponding to the three phases and a neutral conductor corresponding to the neutral point between said three phases, three networks each including in combination a diode and a silicon controlled rectifier having a gate, each network being connected to a different supply conductor, three transformer circuits each including in combination primary means and secondary means, each primary means being connected across a different pair of conductors selected from the group of the three supply conductors and the neutral conductor; each secondary means being adapted for producing two A.C. voltages which have a selected phase relation with respect to each other, means for combining and rectifying said A.C. voltages to produce three different D.C. signal voltages, means for connecting each D.C. signal voltage to the gate of a different silicon controlled rectifier, and means for controlling each of said D.C. signal voltages.

7. An electrical power device comprising in combination a three phase source of alternating current having three supply conductors corresponding to the three phases and a neutral conductor corresponding to the neutral point between said three phases, three networks each including in combination a diode and a silicon controlled rectifier having a gate, each network being connected to a different supply conductor, three transformer circuits each including in combination primary means and secondary means, each primary means being connected across a different pair of conductors selected from the group of the three supply conductors and the neutral conductor; each secondary means being adapted for producing two A.C. voltages which have a selected phase relation with respect to each other rectifying means associated with each secondary means for converting each A.C. voltage into a D.C. voltage, means for combining different ones of said D.C. voltages into pairs to produce three separate D.C. signal voltages each of which is the composite of two different D.C. voltages, means for connecting each D.C. signal voltage to the gate of a different silicon controlled rectifier, and means for controlling each of said D.C. signal voltages.

8. An electrical power device according to claim 1 in which the means for controlling the D.C. signal voltages includes saturable reactors.

9. An electrical power device according to claim 1 in which the means for controlling the triggering voltages includes uni-junction transistors.

10. An electrical power device according to claim 1 in which the means for controlling the D.C. signal voltages includes three saturable reactors having control windings connected in series to a source of control current.

11. An electrical power device according to claim 1 in which the means for controlling the D.C. signal voltages includes six saturable reactors each having main control windings connected in series to a source of control current, three of said saturable reactors also having bias control windings connected in series to a source of biasing current.

12. An electrical power device according to claim 1 in which the means for controlling the triggering voltages includes uni-junction transistors connected to a source of control voltage.

13. An electrical power device according to claim 1 in which the means for controlling the triggering voltages includes three uni-junction transistor networks each having a uni-junction transistor, a capacitor, and a signal-output transformer.

14. For use with an A.C. generator having three output lines representing three phases, a converter comprising three silicon controlled rectifiers having their anodes respectively connected to the three generator output lines and their cathodes connected in common to one D.C. output line, three diodes having cathodes which are connected respectively to the three generator output lines and anodes which are connected in common to the other D.C. output line, said silicon controlled rectifiers each having a gate for triggering such rectifier into a conductive state, and three transformers having primary windings each connected across a different phase of the generator output, each transformer also having two secondary windings, all of said secondary windings having one end connected in common to one D.C. output line, the other end of each secondary winding being connected in paired relationship with the other end of a secondary winding of another transformer through rectifier means to form a current lead having unidirectional voltage, the several paired secondary connections being so arranged as to form three separate current leads which are respectively connected to the three gates through saturable reactor means.

15. For use with an A.C. generator having three output lines representing three phases, a converter comprising three silicon controlled rectifiers having their anodes respectively connected to the three generator output lines and their cathodes connected in common to one D.C. output line, three diodes having cathodes which are connected respectively to the three generator output lines and anodes which are connected in common to the other D.C. output line, said silicon controlled rectifiers each having a gate for triggering such rectifier into a conductive state, three transformers having primary windings each connected across a different phase of the generator output, each transformer also having two secondary windings, all of said secondary windings having one end connected in common to one D.C. output line, the other end of each secondary windings being connected in paired relationship with the other end of a secondary winding of another transformer through rectifier means to form a current lead having unidirectional voltage, the several paired secondary connections being so arranged as to form three separate current leads which are respectively connected to the three gates through saturable reactor means, and control means operatively associated with the saturable reactor means for regulating the current in the current leads.

16. For use with an A.C. generator having three output lines representing three phases, a converter comprising three silicon controlled rectifiers having their anodes respectively connected to the three generator output lines and their cathodes connected in common to one D.C. output line, three diodes having cathodes which are connected respectively to the three generator output lines and anodes which are connected in common to the other D.C. output line, said silicon controlled rectifiers each having a gate for triggering such rectifier into a conductive state, and voltage supply means comprising first, second, third, fourth, fifth and sixth diodes and first, second, and third transformers, each of said transformers having first and second secondary windings which are connected in common at their inner ends in the manner of a center tap, said common connections of all of the secondaries being connected in common to one D.C. output terminal of the converter, each of said secondary windings also having an outer terminal end electrically remote from the center tap connection, the outer terminal ends of the secondaries of the first transformer being connected to the anodes, respectively, of the first and second diodes, the outer terminal ends of the secondaries of the second transformer being connected to the anodes, respectively, of the third and fourth diodes, the outer terminal ends of the secondaries of the third transformer being connected to the anodes, respectively, of the fifth and sixth diodes, the cathodes of the first and sixth diodes being connected in common to one end of the gate winding of a first saturable reactor, the cathodes of the second and third diodes being connected in common to one end of the gate winding of a second saturable reactor, the cathodes of the fourth and fifth diodes being connected in common to one end of the gate winding of a third saturable reactor, the other ends of the three gate windings of the saturable reactors being respectively connected to the gates of the three silicon controlled rectifiers, each of said saturable reactors having a control winding, and control means operably connected to the control windings of the saturable reactors.

17. For use with an A.C. generator having three output lines representing three phases, a converter comprising three silicon controlled rectifiers having their anodes respectively connected to the three generator output lines and their cathodes connected in common to one D.C. output line, three diodes having cathodes which are connected respectively to the three generator output lines and anodes which are connected in common to the other D.C. output line, said silicon controlled rectifiers each having a gate for triggering such rectifier into a conductive state, and voltage supply means comprising first, second, third, fourth, fifth and sixth diodes and first, second, and third transformers each of said transformers having first and second secondary windings which are connected in common at their inner ends in the manner of a center tap, said common connections of all of the secondaries being connected in common to one D.C. output terminal of the converter, each of said secondary windings also having an outer terminal end electrically remote from the center tap connection, the outer terminal ends of the secondaries of the first transformer being connected to the anodes, respectively, of the first and second diodes, the outer terminal ends of the secondaries of the second transformer being connected to the anodes, respectively, of the third and fourth diodes, the outer terminal ends of the secondaries of the third transformer being connected to the anodes, respectively, of the fifth and sixth diodes, the cathode of the first diode being connected to one terminal of the gate winding of a first saturable reactor, the cathode of the second diode being connected to one terminal of the gate winding of a second saturable reactor, the cathode of the third diode being connected to one terminal of the gate winding of a third saturable reactor, the cathode of the fourth diode being connected to the terminal of the gate winding of a fourth saturable recator, the cathode of the fifth diode being connected to the terminal of the gate winding of a fourth saturable reactor, the cathode of the sixth diode being connected to the terminal of the gate winding of a sixth saturable reactor, the other terminals of the gate windings of the first and sixth saturable reactors being connected in common to the gate of one of the three silicon controlled rectifiers, the other terminals of the gate windings of the second and third saturable reactors being connected in common to the gate of a second of the three silicon controlled rectifiers, and the other terminals of the gate windings of the fourth and fifth saturable reactors being connected in common to the gate of the third of the three silicon controlled rectifiers.

18. A three-phase bridge rectifier converter according to claim 17 further characterized by means for controlling the several saturable reactors.

19. A three-phase bridge rectifier converter according to claim 17 further characterized by means for magnetically resetting said saturable reactors.

20. For use with an A.C. generator having three output lines representing three phases, a controller comprising three silicon controlled rectifiers having their anodes respectively conected to the three generator output lines and their cathodes connected respectively to three A.C. power output lines to which loads may be connected, three diodes having cathodes which are connected respectively to the three generator output lines and anodes which are connected respectively to said three A.C. power output lines, said silicon controlled rectifiers each having a gate for triggering such rectifier into a conductive state, and six transformers having primary windings each connected across a different phase of the generator output, each transformer also having a secondary winding, each secondary winding being connected in paired relationship with the secondary winding of another transformer through rectifier means to form a current lead having unidirectional voltage, the several paired secondary connections being so arranged as to form three separate current leads which are respectively connected to the three gates through saturable reactor means.

21. For use with an A.C. generator having three generator output conductors representing three phases and a neutral conductor representing the neutral point between said phases, a controller comprising three silicon controlled rectifiers having their anodes respectively connected to the three generator output conductors and their cathodes connected respectively to three A.C. power output lines to which loads may be connected, three diodes having cathodes which are connected respectively to the three generator output conductors and anodes which are connected respectively to said three A.C. power output lines, said silicon controlled rectifiers each having a gate for triggering such rectifier into a conductive state, and voltage supply means comprising six transformers and three saturable reactors, each of said transformers having primary and secondary windings, each of the saturable reactors including a control winding and a gate winding, said primaries being connected respectively across different pairs of conductors selected from the group consisting of the three generator output conductors and the neutral conductor, the secondaries being paired to produce three positive D.C. signal voltages, said positive D.C. voltages being respectively connected to the one end of the gate windings, the other ends of the three gate windings of the saturable reactors being respectively connected to the gates of the three silicon controlled rectifiers, each of said saturable reactors having a control winding, said control windings being connected in series, and control means also connected in series with the control windings of the three saturable reactors.

22. For use with an A.C. generator having three generator output conductors representing three phases and a neutral conductor representing the neutral point between said phases, a controller comprising three silicon controlled rectifiers having their anodes respectively connected to the three generator output conductors and their cathodes connected respectively to three A.C. power output lines to which loads may be connected, three diodes having cathodes which are connected respectively to the three generator output conductors and anodes which are connected respectively to said three A.C. power output lines, said silicon controlled rectifiers each having a gate for triggering such rectifier into a conductive state, and voltage supply means comprising six transformers and six saturable reactors, each of said transformers having primary and secondary windings, each of the saturable reactors including a control winding and a gate winding, said primaries being connected respectively across different pairs of conductors selected from the group consisting of the three generator output conductors and the neutral conductor, each of the secondaries having first and second output terminals, the second output terminals of the secondaries being paired to produce three different D.C. leads, the first terminals of each of the secondaries being respectively connected through diodes to the gate windings of the saturable reactors, the outputs of said gate windings being paired to produce three different D.C. leads, the three D.C. leads from the gate windings being respectively connected to the gates of the silicon controlled rectifiers.

23. A three-phase bridge rectifier converter according to claim 22 further characterized by means for magnetically resetting the several saturable reactors.

24. A three-phase bridge rectifier converter according to claim 22 further characterized by means for magnetically resetting said saturable reactors.

References Cited
UNITED STATES PATENTS

| | | | |
|---|---|---|---|
| 3,114,098 | 12/1963 | Rallo et al. | 321—18 |
| 3,131,545 | 5/1964 | Gross et al. | |
| 3,134,068 | 5/1964 | Feltman | 321—5 X |
| 3,151,286 | 9/1964 | Berman et al. | 321—47 X |
| 3,230,440 | 1/1966 | Kleiner | 321—18 X |
| 3,260,922 | 7/1966 | Rieke. | |
| 3,270,270 | 8/1966 | Yenisey | 321—18 |
| 3,273,043 | 9/1966 | Clarke et al. | 321—18 |
| 3,273,045 | 9/1966 | Benson. | |

JOHN F. COUCH, *Primary Examiner.*

W. M. SHOOP, *Assistant Examiner.*